US006638606B2

(12) United States Patent
Yoshihara et al.

(10) Patent No.: US 6,638,606 B2
(45) Date of Patent: Oct. 28, 2003

(54) HARDCOAT FILM

(75) Inventors: Toshio Yoshihara, Shinjuku (JP); Yurie Ota, Shinjuku (JP); Nobuko Takahashi, Shinjuku (JP); Noboru Kunimine, Shinjuku (JP); Satoshi Shioda, Shinjuku (JP); Mikiko Hojo, Shinjuku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/046,171

(22) Filed: Jan. 16, 2002

(65) Prior Publication Data

US 2002/0098350 A1 Jul. 25, 2002

Related U.S. Application Data

(63) Continuation of application No. 09/401,407, filed on Sep. 22, 1999, now Pat. No. 6,376,060.

(30) Foreign Application Priority Data

Sep. 25, 1998 (JP) .............................. 10-272219
Sep. 25, 1998 (JP) .............................. 10-272220
Dec. 25, 1998 (JP) .............................. 10-370574

(51) Int. Cl.$^7$ ................................. B32B 5/00
(52) U.S. Cl. ................. 428/206; 428/354; 428/344; 428/915; 428/916; 428/913; 428/42.1; 428/41.7; 428/688; 428/323; 428/142; 428/143; 106/287.35
(58) Field of Search ................. 428/344, 915, 428/916, 913, 412, 42.1, 40.1, 354, 41.7, 688, 323, 221, 141, 142, 143, 195, 206; 106/287.35; 524/897; 427/331, 372.2, 379, 384, 385.5

(56) References Cited

U.S. PATENT DOCUMENTS 5,770,306 A    6/1998   Suzuki et al.
5,866,236 A    2/1999   Faykish et al.
6,329,041 B1 * 12/2001  Tsuchiya et al.

FOREIGN PATENT DOCUMENTS

JP    2-41362    2/1990
JP    7-151914   6/1995

* cited by examiner

Primary Examiner—Deborah Jones
Assistant Examiner—Wendy Boss
(74) Attorney, Agent, or Firm—Parkhurst & Wendel, L.L.P.

(57) ABSTRACT

A hardcoat for a plastic substrate film is provided which has good suitability for printing and satisfactory hardness, can prevent influence of the deformation of a plastic substrate film from extending to the hardcoat, and is resistant to cracking and peeling. The hardcoat is produced from a coating component containing one or more organic components having a polymerizable functional group and an inorganic filler, at least one of the organic components being free from a hydrogen bond-forming group. In the hard coat, the content of the inorganic filler in the surface of the hardcoat is higher than that in the interior of the hardcoat. The hardcoat can be applied to antireflection films and hologram labels.

13 Claims, No Drawings

HARDCOAT FILM

This is a Continuation of application Ser. No. 09/401,407 filed Sep. 22. 1999 U.S. Pat. No. 6,376,060.

TECHNICAL FIELD

The present invention relates to a hardcoat for a highly transparent plastic substrate, having good suitability for printing. More particularly, the present invention relates to a hardcoat which has a surface capable of realizing high-speed printing and, in addition, possessing excellent scratch resistance and, at the same time, possesses excellent crack preventive properties, adhesion, and capability of preventing influence of, for example, the deformation of a plastic substrate from extending to the hardcoat, a hardcoat for holograms, a hardcoat film, an antireflection film, and a production process thereof.

The present invention further relates to a hardcoat provided on a highly transparent plastic substrate film, a hardcoat film, and a production process thereof, and more particularly to a hardcoat possessing excellent scratch resistance and, at the same time, excellent crack preventive properties, adhesion, and capability of preventing influence of, for example, the deformation of a plastic substrate from extending to the hardcoat, a hardcoat film, and a production process thereof. The present invention further relates to an antireflection film comprising an antireflection layer provided on the hardcoat. The present invention further relates to a heat reflecting film comprising a heat reflecting layer provided on the hardcoat. The present invention further relates to an ultraviolet shielding film comprising an ultraviolet shielding layer provided on the hardcoat.

BACKGROUND OF THE INVENTION

In recent years, plastic products are being substituted for glass products from the viewpoints of moldability and a reduction in weight. Since, however, the surface of the plastic products is likely to be scratched, a hardcoat film is in many cases applied to the plastic products to impart scratch resistance. Also in the case of the conventional glass products, there is a growing tendency for a plastic film to be applied thereto to prevent scattering. Due to unsatisfactory hardness of the plastic films, however, a hardcoat is in most cases formed on the surface of the plastic films.

The conventional hardcoat film has been produced by coating the surface of a plastic substrate film with a highly scratch-resistant resin, generally a thermosetting resin or an ionizing radiation curing resin, such as an ultraviolet curing resin, either directly or through an about 1 μm-thick primer layer to a small thickness of about 3 to 15 μm (for example, Japanese Patent Laid-Open No. 151914/1995).

Further, in the conventional hardcoat films, an attempt has been made to add an inorganic filler to a film-forming organic component having a polymerizable functional group to enhance the hardness (for example, Japanese Patent Laid-Open No. 41362/1990).

The conventional hardcoats, however, have a small coating thickness and, hence, hardcoat is directly influenced by the deformation of the plastic substrate film underlying the hardcoat. That is, the surface strength is low and unsatisfactory.

On the other hand, merely increasing the thickness of the hardcoat to a larger value than the conventional thickness, that is, more than 3 to 15 μm, can improve the surface hardness of the hardcoat film, but on the other hand, cracking or peeling is likely to occur and, at the same time, curling derived from cure shrinkage is increased. Therefore, the hardcoat film cannot be put to practical use.

In the conventional hardcoat films, incorporation of the inorganic filler into the organic component having a polymerizable functional group can provide a film having improved surface hardness. In this case, however, cracking and peeling are likely to occur and, at the same time, curling derived from cure shrinkage is increased. This renders the hardcoat film unsatisfactory for practical use.

When the hardcoats are used as protective films for preventing specific products from being scratched, production numbers, dates and the like associated with the product are printed on the hardcoats. In this case, for hardcoats to which scratch resistance has been imparted, for example, by forming a dense film as the surface layer or by imparting slipperiness to the surface, a printing ink is less likely to be penetrated thereinto or a dye for sublimation transfer is less likely to be fixed. This results in poor productivity.

When a tacky layer is present on the backside of the plastic substrate film, the formation of a hardcoat on the other side of the substrate film followed by superposition or winding of the assemblies poses a problem that the tacky layer is transferred to the hardcoat.

When the hardcoats are used as protective films for preventing specific products from being scratched, production numbers, dates and the like associated with the product are printed on the hardcoats. In this case, for hardcoats to which scratch resistance has been imparted, for example, by forming a dense film as the surface layer or by imparting slipperiness to the surface, a printing ink is less likely to be penetrated thereinto or a dye for sublimation transfer is less likely to be fixed. This results in poor productivity.

DISCLOSURE OF THE INVENTION

First Invention

Accordingly, it is an object of the first invention to solve the above problems involved in hardcoat films using a plastic substrate and to provide a hardcoat for a plastic substrate, a hardcoat for a hologram, a hardcoat film comprising the hardcoat applied to a plastic substrate, an antireflection film comprising an antireflection layer applied onto the hardcoat, and a process for forming a hardcoat which can realize satisfactory hardness properties while enjoying good suitability for printing even in the case of a small coating thickness, can prevent the influence of the deformation of the plastic substrate on the hardcoat, can prevent cracking and peeling of the hardcoat, can bring the pencil hardness of the surface of the hardcoat film to H to 5H, and, further, even when a tacky layer is present on the backside of the plastic substrate with a hardcoat formed on the front side thereof, can prevent the transfer of the backside layer onto the hardcoat. Thus, according to the first invention, there is provided a hardcoat for a plastic substrate, characterized by being produced from a coating component containing one or more organic components having a polymerizable functional group and an inorganic filler, at least one of the organic components being free from a hydrogen bond-forming group.

Further, according to the present invention, there is provided a process for producing a hardcoat for a plastic substrate, characterized by comprising the steps of: coating the surface of a plastic substrate with a coating liquid comprising one or more organic components having a polymerizable functional group and an inorganic filler, at least one of the organic components being free from any hydrogen bond-forming group; drying the coating to remove the solvent in the coating; aging the dried coating at a temperature of 20 to 100° C. for 5 sec to 5 min; and then curing the coating.

In the hardcoat film of the present invention comprising a hardcoat applied onto a plastic substrate film, hardness properties have been imparted, for example, by coating the hardcoat either directly or through other layer onto at least one side of the plastic substrate.

According to the hardcoat for a plastic substrate film of the present invention, the content of the inorganic filler in the surface of the hardcoat is larger than that in the interior of the hardcoat, and the surface of the hardcoat has irregularities. This increases the surface area, or a porous structure is present in a very small region. Therefore, the suitability for printing can be enhanced, and the hardcoat is highly non-tacky.

According to the hardcoat for a plastic substrate film of the present invention, reticular connection of at least a part of the inorganic filler is preferred from the viewpoints of preventing cracking and peeling of the hardcoat, preventing curling of the hardcoat film per se, and, at the same time, enhancing the pencil hardness of the hardcoat film in its surface.

Further, according to the hardcoat for a plastic substrate film of the present invention, the formation of an independent network of at least a part of the organic component and the inorganic filler is preferred from the viewpoints of preventing cracking and peeling of the hardcoat, preventing curling of the hardcoat film per se and, at the same time, enhancing the pencil hardness of the hardcoat film in its surface. More preferably, when both at least a part of the network of the organic component and at least a part of the network of the inorganic filler are present independently, the above effects can be further enhanced.

In this case, the hardcoat of the present invention has been produced from one or more organic components having a polymerizable functional group and an inorganic filler, at least one of the organic components being free from a hydrogen bond-forming group. Therefore, the network of the organic component obtained by polymerization of the organic component and the network of the inorganic filler formed by cohesive force between inorganic filler particles themselves can be present independently to some extent while partial entanglement of these networks with each other. This structure can offer a combination of high hardness and high flexibility of the coating. Specifically, the hardcoat film comprising the hardcoat of the present invention applied onto a plastic substrate film, despite high pencil hardness of the surface thereof, can prevent cracking and peeling of the hardcoat and prevent curling of the hardcoat film per se.

If a large number of hydroxyl, carboxyl, amido and other hydrogen bond-forming groups are present in the organic component of the hard coat for a plastic substrate film, the surface of the inorganic filler particles and the organic component are strongly bonded to each other through a hydrogen bond, resulting in breaking of the network structure of the inorganic filler particles per se. This is likely to create such a structure in the hardcoat that inorganic filler particles locally cohere. In this case, the formed film has improved surface hardness, but on the other hand, cracking and peeling are likely to occur and, at the same time, curling derived from cure shrinkage is increased. This renders the hardcoat film unsatisfactory for practical use. For this reason, at least one of the one or more organic components should not have any hydrogen bond-forming group.

The antireflection film of the present invention is characterized by comprising a plastic substrate film, the hardcoat provided either directly or through other layer on the plastic substrate film, and an antireflection layer provided on the hardcoat.

The hardcoat for a hologram label according to the present invention is applied to a hologram label characterized by comprising: a plastic substrate film; provided on one side of the plastic substrate film in the following order, a hologram image-forming layer, an aluminum deposit, and a pressure-sensitive adhesive layer; and the hardcoat provided on the other side of the plastic substrate film.

The hardcoat for a hologram label according to the present invention is characterized in that, in the formation of the hardcoat on one side of a plastic substrate film followed by the formation of a hologram image-forming layer, an aluminum deposit, and a pressure-sensitive adhesive layer in that order on the backside of the substrate film to produce a hologram label, even though the assemblies are put on top of each other or one another or wound in the course of the production of the hologram label, the transfer of a tacky layer, such as a hologram image-forming layer, provided on the backside of the substrate film onto the hardcoat provided on the other side of the substrate film can be prevented.

In this case, the hardcoat of the present invention has been produced from one or more organic components having a polymerizable functional group and an inorganic filler, at least one of the organic components being free from a hydrogen bond-forming group. Therefore, the network of the organic component obtained by polymerization of the organic component and the network of the inorganic filler formed by cohesive force between inorganic filler particles themselves can be present independently to some extent while there is partial entanglement of these networks with each other. This structure can offer a combination of high hardness and high flexibility of the coating. Specifically, the hardcoat film comprising the hardcoat of the present invention applied onto a plastic substrate film, despite high pencil hardness of the surface thereof, can prevent cracking and peeling of the hardcoat and prevent curling of the hardcoat film per se.

Combined use of two inorganic fillers having different primary particle diameters in the formation of the hardcoat to prevent the creation of the tackiness is not limited to the hologram, and is generally applicable to the cases where a tacky layer is present on the backside of the plastic substrate.

Second Invention

It is an object of the second invention to solve the above problems involved in hardcoat films using a plastic substrate and to provide a hardcoat for a plastic substrate film, a hardcoat film comprising the hardcoat applied to a plastic substrate, and a process for forming a hardcoat which can prevent the influence of the deformation of the plastic substrate on the hardcoat, can prevent cracking and peeling of the hardcoat, can prevent curling of the hardcoat film per se, and can bring the pencil hardness of the surface of the hardcoat film to 2H to 5H. It is another object of the present invention to provide an antireflection film, with hardness properties being imparted thereto, comprising an antireflection layer formed on the hardcoat, to provide a heat reflecting film, with hardness properties being imparted thereto, comprising a heat reflecting layer formed on the hardcoat, and to provide an ultraviolet shielding layer, with hardness properties being imparted thereto, comprising an ultraviolet shielding layer formed on the hardcoat.

The above objects can be attained by the following invention. Specifically, according to the second invention, there is provided a hardcoat for a plastic substrate, produced from a coating component containing one or more organic components having a polymerizable functional group and an inorganic filler, at least one of the organic components being free from a hydrogen bond-forming group, at least a part of the inorganic filler having a polymerizable functional group.

According to the present invention, there is further provided a process for forming a hardcoat for a plastic substrate, comprising the steps of: coating the surface of a plastic substrate with a coating liquid comprising one or more organic components having a polymerizable functional group and an inorganic filler, at least one of the organic components being free from any hydrogen bond-forming group, at least a part of the inorganic filler having a polymerizable functional group; drying the coating to remove the solvent in the coating; aging the dried coating at a temperature of 25 to 100° C. for 5 sec to 5 min; and then curing the coating.

In the hardcoat film of the present invention comprising a hardcoat applied onto a plastic substrate, hardness properties have been imparted, for example, by coating the hardcoat onto at least one side of the plastic substrate.

According to the hardcoat for a plastic substrate of the present invention, reticular connection of at least a part of the inorganic filler is preferred from the viewpoints of preventing cracking and peeling of the hardcoat, preventing curling of the hardcoat film per se, and, at the same time, enhancing the pencil hardness of the hardcoat film in its surface.

Further, according to the hardcoat for a plastic substrate of the present invention, the formation of an independent network of at least a part of the organic component and the inorganic filler while forming a covalent bond between a part of the polymerizable functional group in the organic component and a part of the polymerizable functional group in the inorganic filler can offer filling effect of the inorganic filler and can prevent cracking and peeling of the hardcoat, can prevent curling of the hardcoat film per se, and, at the same time, can enhance the pencil hardness of the hardcoat film in its surface. Preferably, when both at least a part of the network of the organic component and at least a part of the network of the inorganic filler are present independently while forming a covalent bond between at least a part of the polymerizable functional group in the network of the organic component and at least a part of the polymerizable functional group in the network of the inorganic filler, both the networks reinforce each other, further enhancing the above effect.

More specifically, the hardcoat of the present invention has been produced from one or more organic components having a polymerizable functional group and an inorganic filler, at least one of the organic components being free from a hydrogen bond-forming group. Therefore, the network of the organic component obtained by polymerization of the organic component and the network of the inorganic filler formed by cohesive force between inorganic filler particles themselves can be present independently to some extent while partial entanglement of these networks with each other due to the covalent bond between the polymerizable functional group in at least a part of the inorganic filler and the network of the organic component. This structure can offer a combination of high hardness and high flexibility of the coating, and thus contributes to a significant improvement in coating strength. Specifically, the hardcoat film comprising the hardcoat of the present invention applied onto a plastic substrate film, despite high pencil hardness of the surface thereof, can prevent cracking and peeling of the hardcoat and prevent curling of the hardcoat film per se.

If a large number of hydroxyl, carboxyl, amido and other hydrogen bond-forming groups are present in the organic component of the hard coat for a plastic substrate film, the surface of the inorganic filler particles and the organic component are strongly bonded to each other through a hydrogen bond, resulting in breaking of the network structure of the inorganic filler particles per se. This is likely to create such a structure in the hardcoat that inorganic filler particles locally cohere. In this case, the formed film has improved surface hardness, but on the other hand, cracking and peeling are likely to occur and, at the same time, curling derived from cure shrinkage is increased. This renders the hardcoat film unsatisfactory for practical use. For this reason, at least one of the one or more organic components should not have any hydrogen bond-forming group.

BEST MODE FOR CARRYING OUT THE INVENTION

According to the first invention, preferred inorganic fillers have a particle diameter of 0.1 to 0.3 $\mu$m. An inorganic filler in the above particle diameter range does not inhibit the motion of the segment of polymer chains, is likely to independently form a network and, even when a large amount of the inorganic filler is present on the outermost surface of the coating, is not detrimental to the transparency of the coating. When the particle diameter is less than 0.01 $\mu$m, the formation of an independent network is disadvantageously difficult, while a particle diameter exceeding 0.3 $\mu$m is unfavorably detrimental to the transparency.

Regarding the type of the inorganic filler, ultrafine particles of a metal oxide are preferred because they form a strong reticular network in the coating due to strong cohesive force derived from the large surface area. Ultrafine particles of metal oxides usable herein include ultrafine particles of silica, alumina, titania, zirconia, tin oxide, and ITO. The inorganic filler is dispersed in the matrix resin, and, when the content of the inorganic filler is in a given content range, the inorganic filler can reticularly cohere, leading to the formation of a reticular structure through percolation.

According to the present invention, the one or more organic components are preferably such that at least one of the organic components is an ionizing radiation curing resin material having 4 moles or more, per molecule, of a polymerizable functional group which, upon exposure, for example, to heat or ultraviolet light or an electron beam, is polymerized to form a three-dimensionally reticular network. In this case, if hydroxyl, carboxyl, amido and other hydrogen bond-forming groups are present in the organic component, the surface of the ultrafine particles of the metal oxide and the organic component are strongly bonded to each other through a hydrogen bond, resulting in breaking of the network structure of the particles per se. This is likely to create such a structure in the hardcoat that particles locally cohere. In this case, the formed hardcoat lacks in flexibility. For this reason, preferably, at least one of the one or more organic components does not have any hydrogen bond-forming group.

The molecular weight of the organic component used in the present invention is preferably 1000 to 30000 in terms of the number average molecular weight. When the molecular weight is less than 1000, a strong network cannot be formed. On the other hand, when the molecular weight is more than 30000, this excessively large molecular weight unfavorably inhibits the formation of the network of the inorganic filler.

Specific examples of preferred organic components having a polymerizable functional group and free from a hydrogen bond-forming group usable in the present invention include polyfunctional acrylates, such as dipentaerythritol hexaacrylate (DPHA), pentaerythritol tetraacrylate, ditrimethylolpropane tetraacrylate, and urethane (meth) acrylate, epoxy (meth)acrylate, polyester acrylate, polyacryl acrylate, and other oligomers or polymers having 4 moles or more, per molecule, of a polymerizable functional group.

According to the present invention, the weight ratio of the organic component to the inorganic filler is preferably 2:8 to 7:3, particularly preferably 3:7 to 6:4. In the conventional hardcoat, the content of the inorganic filler therein is about 3:7 in terms of the ratio of the inorganic filler to the organic component. On the other hand, according to the present invention, use of one or more organic components, at least one of the organic components being free from a hydrogen bond-forming group and having a polymerizable functional group, have enabled the amount of the inorganic filler added to be increased to a value much larger than that used in the conventional hardcoat. Therefore, the amount of the inorganic filler, present on the outermost surface, necessary for improving the suitability for printing can be increased, and, at the same time, the formation of the network structure of the inorganic filler can be facilitated.

When the amount of the inorganic filler is excessively large, the hardcoat becomes very brittle although the hardness of the coating is increased. On the other hand, when the amount of the organic component is excessively large, the hardness of the coating is extremely lowered.

The ratio of the organic component to the inorganic filler falling within the above range is important for rendering the content of the inorganic filler in the hardcoat larger in the surface of the hardcoat than the interior of the hardcoat to form a surface having irregularities.

The plastic substrate and other layer, which are effective in the hardcoat film according to the present invention, have a pencil hardness of about 4B to HB. An example of this type of plastic substrate is a polyethylene terephthalate film, and an example of this type of other layers is a recording layer or a hologram layer into which information can be written by a laser beam or the like. In applying the hardcoat film onto an object, when the surface of the object in the assembly should be visible, the plastic substrate should be transparent. The pencil hardness of the hardcoat per se is H to 5H.

According to the present invention, "pencil hardness of the hardcoat per se" is a pencil hardness as measured, by the pencil hardness test according to JIS K 5400, for a coat formed by coating of the material onto a not less than 25 μm-thick polyethylene terephthalate film to a thickness of about 3 μm on a dry basis. In the pencil hardness test, the test is repeated five times for each of pencils having different hardnesses to determine the hardness of the pencil which, in the repetition of the test five times, did not cause any abnormal phenomenon in the appearance, such as a scratch. For example, in the repetition of the test five times using a pencil of 3H, when any abnormal phenomenon did not occur in the appearance, the pencil hardness of the material is at least 3H.

According to the present invention, "pencil hardness of the hardcoat film" refers to a pencil hardness, as measured by the pencil hardness test according to JIS K 5400, for hardcoat films comprising the hardcoat formed on various plastic substrate films, and is evaluated in the same manner as described above in connection with the "pencil hardness of the hardcoat per se." In this connection, it should be noted that the pencil hardness of the hardcoat film is influenced by the material of the hardcoat, the thickness of the hardcoat, and other layers (including the plastic substrate film) other than the hardcoat.

Antireflection properties may be imparted to the hardcoat film with the hardcoat of the present invention being applied thereon. This can be attained, for example, by further forming an anitreflection layer on the surface of the hardcoat. The antireflection layer may be formed on the surface of the hardcoat by the following methods ① to ⑥.

① A method wherein an about 0.1 μm-thick very thin layer of $MgF_2$ or the like is formed as the antireflection layer.

② A method wherein a metal layer is deposited as an antireflection layer.

③ A method wherein a low refractive layer of a material having a lower light refractive index (refractive index: not more than 1.46) than the hardcoat is provided as an antireflection layer.

④ A method wherein a high refractive layer is provided so as to contact the hardcoat, and a low refractive layer is provided on the high refractive layer. In this case, the high refractive layer and the low refractive layer constitute an antireflection layer. For example, an ultrafine particle layer of a metal oxide having a high refractive index may be unevenly distributed in the antireflection layer in its region in contact with the hardcoat.

⑤ A method wherein the layer construction in ④ is repeatedly stacked to form an antireflection layer.

⑥ A method wherein an intermediate refractive layer, a high refractive layer, and a low refractive layer are provided to form an antireflection layer.

In the production of the hardcoat for a plastic substrate film according to the present invention, the presence of the inorganic filler in the hardcoat in a larger amount in the outermost surface thereof than the interior thereof to form independent networks of the organic component and the inorganic filler is indispensable for improving both the strength and the flexibility of the hardcoat.

In order to realize the above ideal distribution of the inorganic filler and to form the independent network, the coating, which has been coated either directly or through other layer on the plastic substrate film, may be dried to remove the solvent contained in the coating followed by aging at a temperature of 20 to 100° C. for 5 sec to 5 min to grow the reticular structure of the inorganic filler within the organic filler (percolation). Next, the coating is cured, for example, by irradiation with an ionizing radiation to obtain the hardcoat of the present invention with an independent network being formed therein.

For the aging, the temperature and the holding time should be properly varied according to the viscosity and glass transition temperature of the organic component used, the thickness of the coating and the like. In any case, however, aging under the above conditions can provide favorable properties.

Third Invention

Preferred inorganic fillers usable in the present invention have a particle diameter of 0.01 to 0.3 μm. An inorganic filler in the above particle diameter range does not inhibit the motion of the segment of polymer chains, is likely to independently form a network and, at the same time, is not detrimental to the transparency of the coating. When the particle diameter is less than 0.01 μm, the formation of an independent network is disadvantageously difficult, while a particle diameter exceeding 0.3 μm is unfavorably detrimental to the transparency.

Regarding the type of the inorganic filler, ultrafine particles of a metal oxide are preferred because they form a strong reticular network in the coating due to strong cohesive force derived from the large surface area. Ultrafine particles of metal oxides usable herein include ultrafine particles of silica, alumina, titania, zirconia, tin oxide, and ITO. The inorganic filler is dispersed in the matrix resin, and, when the content of the inorganic filler is in a given content range, the inorganic filler can reticularly cohere, leading to the formation of a reticular structure through percolation.

The inorganic filler used in the present invention is such that a polymerizable functional group has been introduced into at least a part of the inorganic filler described above. The amount of the polymerizable functional group in the inorganic filler is preferably 0.01 μmol to 10 mmol per g of the inorganic filler. When the amount of the polymerizable functional group is less than the lower limit of the above amount range, the inorganic filler is not covalently bonded to the organic component. On the other hand, when the amount of the polymerizable functional group exceeds the upper limit of the above amount range, the network structure of the inorganic filler particles per se is broken. This causes inorganic filler particles to cohere, disadvantageously resulting in extremely lowered strength of the coating.

According to the present invention, the one or more organic components are preferably such that at least one of the organic components is an ionizing radiation curing resin material having 4 moles or more, per molecule, of a polymerizable functional group which, upon exposure, for example, to heat or ultraviolet light or an electron beam, is polymerized to form a three-dimensionally reticular network. In this case, if hydroxyl, carboxyl, amido and other hydrogen bond-forming groups are present in the organic component, the surface of the ultrafine particles of the metal oxide and the organic component are strongly bonded to each other through a hydrogen bond, resulting in breaking of the network structure of the particles per se. This is likely to create such a structure in the hardcoat that particles locally cohere. In this case, the formed hardcoat lacks in flexibility. For this reason, preferably, at least one of the one or more organic components does not have any hydrogen bond-forming group.

The molecular weight of the organic component used in the present invention is preferably 1000 to 30000 in terms of the number average molecular weight. When the molecular weight is less than 1000, a strong network cannot be formed. On the other hand, when the molecular weight is more than 30000, this excessively large molecular weight unfavorably inhibits the formation of the network of the inorganic filler.

Specific examples of preferred organic components having a polymerizable functional group and free from a hydrogen bond-forming group usable in the present invention include polyfunctional acrylates, such as dipentaerythritol hexaacrylate (DPHA), pentaerythritol tetraacrylate, ditrimethylolpropane tetraacrylate, and urethane (meth)acrylate, epoxy (meth)acrylate, polyester acrylate, polyacryl acrylate, and other oligomers or polymers having 4 moles or more, per molecule, of a polymerizable functional group.

According to the present invention, the weight ratio of the organic component to the inorganic filler is preferably 2:8 to 7:3, particularly preferably 3:7 to 6:4. In the conventional hardcoat, the content of the inorganic filler therein is about 3:7 in terms of the ratio of the inorganic filler to the organic component. On the other hand, according to the present invention, use of one or more organic components, at least one of the organic components being free from a hydrogen bond-forming group and having a polymerizable functional group, have enabled the amount of the inorganic filler added to be increased to a value much larger than that used in the conventional hardcoat. Therefore, the hardness can be enhanced, and, at the same time, the formation of the network structure of the inorganic filler can be facilitated. When the amount of the inorganic filler is excessively large, the hardcoat becomes very brittle although the hardness of the coating is increased. On the other hand, when the amount of the organic component is excessively large, the hardness of the coating is extremely lowered.

The plastic substrate film, which is effective in the hardcoat film according to the present invention, has a pencil hardness of about 4B to HB. An example of this type of plastic substrate films is a polyethylene terephthalate film. In applying the hardcoat film onto an object, when the surface of the object in the assembly should be visible, the plastic substrate film should be transparent. The pencil hardness of the hardcoat per se is 2H to 5H.

According to the present invention, "pencil hardness of the hardcoat per se" is a pencil hardness as measured, by the pencil hardness test according to JIS K 5400, for a coat formed by coating of the material onto a not less than 100 μm-thick polyethylene terephthalate film to a thickness of about 5 μm on a dry basis. In the pencil hardness test, the test is repeated five times for each of pencils having different hardnesses to determine the hardness of the pencil which, in the repetition of the test five times, did not cause any abnormal phenomenon in the appearance, such as a scratch. For example, in the repetition of the test five times using a pencil of 3H, when any abnormal phenomenon did not occur in the appearance, the pencil hardness of the material is at least 3H.

According to the present invention, "pencil hardness of the hardcoat film" refers to a pencil hardness, as measured by the pencil hardness test according to JIS K 5400, for hardcoat films comprising the hardcoat formed on various plastic substrate films, and is evaluated in the same manner as described above in connection with the "pencil hardness of the hardcoat per se." In this connection, it should be noted that the pencil hardness of the hardcoat film is influenced by the material of the hardcoat, the thickness of the hardcoat, and other layers (including the plastic substrate film) other than the hardcoat.

Antireflection properties may be imparted to the hardcoat film with the hardcoat of the present invention being applied thereon. This can be attained, for example, by further forming an antireflection layer on the surface of the hardcoat. The antireflection layer may be formed on the surface of the hardcoat by the following methods ① to ⑥.

① A method wherein an about 0.1 μm-thick very thin layer of $MgF_2$ or the like is formed as the antireflection layer.

② A method wherein a metal layer is deposited as an antireflection layer.

③ A method wherein a low refractive layer of a material having a lower light refractive index (refractive index: not more than 1.46) than the hardcoat is provided as an antireflection layer.

④ A method wherein a high refractive layer is provided so as to contact the hardcoat, and a low refractive layer is provided on the high refractive layer. In this case, the high refractive layer and the low refractive layer constitute an antireflection layer. For example, an ultrafine particle layer of a metal oxide having a high refractive index may be unevenly distributed in the antireflection layer in its region in contact with the hardcoat.

⑤ A method wherein the layer construction in ④ is repeatedly stacked to form an antireflection layer.

⑥ A method wherein an intermediate refractive layer, a high refractive layer, and a low refractive layer are provided to form an antireflection layer.

According to the process for forming the hardcoat of the present invention, the formation of independent networks of the organic component and the inorganic filler in the hardcoat is indispensable for improving both the strength and the flexibility of the hardcoat. In order to form the above independent networks, the coating, which has been coated onto the plastic substrate film, may be dried to remove the solvent contained in the coating followed by aging at a temperature of 25 to 100° C. for 5 sec to 5 min to grow the reticular structure of the inorganic filler within the organic filler (percolation). Next, the coating is cured, for example, by irradiation with an ionizing radiation to obtain the hardcoat of the present invention with an independent network being formed therein.

For the aging, the temperature and the holding time should be properly varied according to the viscosity and glass transition temperature of the organic component used, the thickness of the coating and the like. In any case, however, aging under the above conditions can provide favorable properties.

Heat reflecting properties may be imparted to a hardcoat film with the hardcoat of the present invention applied thereonto. This can be attained, for example, by further forming a high refractive conductive layer of ITO, ATO or the like on the surface of the hardcoat.

Ultraviolet shielding properties may be imparted to a hardcoat film with the hardcoat of the present invention applied thereonto. This can be attained, for example, by further forming a thin layer of a material having high ultraviolet absorption capacity, such as titania or zinc oxide, on the surface of the hardcoat.

EXAMPLES

Example A1

A 188 $\mu$m-thick adhesive polyethylene terephthalate film [A4350 (tradename), manufactured by Toyobo Co., Ltd.] was provided as a transparent plastic substrate film. A 1:1 (weight ratio on a solid basis) mixture of dipentaerythritol hexaacrylate [DPHA (tradename), manufactured by Nippon Kayaku Co., Ltd.] as an ionizing radiation curing resin and colloidal silica [IPA-ST (tradename), manufactured by Nissan Chemical Industries Ltd., a 20 wt % (solid basis) solution] as an inorganic filler was coated onto the substrate film to a thickness of about 6 $\mu$m on a dry basis. The coating was dried at 80° C., aged at 80° C. for 60 sec, and then cured by electron beam irradiation under conditions of accelerated voltage 175 kV and exposure 10 Mrad to form a hardcoat. Thus, a hardcoat film of Example A1 was obtained.

Example A2

The same plastic substrate film as used in Example A1 was provided. A 1:1 (weight ratio on a solid basis) mixture of an ionizing radiation curing resin [DPHA (tradename), manufactured by Nippon Kayaku Co., Ltd.] and a solution (solid content 30% by weight) of ultrafine particles of silica [Aerosil 200 (tradename), manufactured by Nippon Aerosil Co., Ltd.] in a 1:1 mixed solvent of methyl ethyl ketone and toluene was coated onto the substrate film to a thickness of about 6 $\mu$m on a dry basis. The coating was dried at 80° C., aged at 80° C. for 60 sec, and then cured by electron beam irradiation under conditions of accelerated voltage 175 kV and exposure 10 Mrad to form a hardcoat. Thus, a hardcoat film of Example A2 was obtained.

Comparative Example A1

The procedure of Example A1 was repeated to form a hardcoat on a plastic substrate film, except that the inorganic filler was not added to the ionizing radiation curing resin. Thus, a hardcoat film of Comparative Example A1 was obtained.

Comparative Example A2

The procedure of Example A1 was repeated to form a hardcoat on a plastic substrate film, except that the mixing ratio (weight ratio on a solid basis) of the ionizing radiation curing resin to the colloidal silica was 2:8. Thus, a hardcoat film of Comparative Example A2 was obtained.

Comparative Example A3

The procedure of Example A1 was repeated to form a hardcoat on a plastic substrate film, except that the mixing ratio (weight ratio on a solid basis) of the ionizing radiation curing resin to the colloidal silica was 8:2. Thus, a hardcoat film of Comparative Example A3 was obtained.

Comparative Example A4

The procedure of Example A1 was repeated to form a hardcoat on a plastic substrate film, except that a hydroxyl-containing ionizing radiation curing resin [SR-399 (tradename), manufactured by Nippon Kayaku Co., Ltd.] was used as the ionizing radiation curing resin and the mixing ratio (weight ratio on a solid basis) of the organic component to the inorganic filler was 5:5. Thus, a hardcoat film of Comparative Example A4 was obtained.

For the hardcoat films obtained in Examples A1 to A2 and Comparative Examples A1 to A4, the pencil hardness of the surface thereof and the pencil hardness of the hardcoat-forming material per se are shown in Table A1. Further, the hardcoat films were evaluated for the degree of curling. When the warpage at both ends of the specimen was 0 to 5 mm, the hardcoat film was evaluated to the effect that curling was not observed at all (○); when the warpage at both ends of the specimen was not less than 1 cm, the hardcoat film was evaluated to the effect that curling was clearly observed (X); and when the warpage at both ends of the specimen was not less than 5 mm to 1 cm, the hardcoat film was evaluated to the effect that slight curling was observed (Δ). The results are also shown in Table A1. Further, the hardcoat films were evaluated for adhesion in terms of the proportion of the number of samples having good adhesion to 100 samples having a size of 1.5 mm square. The results are shown in Table A1.

TABLE A1

|  | Ex. A1 | Ex. A2 | Comp. Ex. A1 | Comp. Ex. A2 | Comp. Ex. A3 | Comp. Ex. A4 |
|---|---|---|---|---|---|---|
| Pencil hardness of surface of plastic substrate | B | B | B | B | B | B |
| Pencil hardness of hardcoat-forming material per se | 3H | 2H | H | HB | HB | H |
| Pencil hardness of surface of hardcoat film | 3H | 2H | H | HB | HB | H |
| Curling | ○ | ○ | X | ○ | X | Δ |
| Adhesion | 100/100 | 100/100 | 100/100 | 50/100 | 100/100 | 75/100 |

As is apparent from Table A1, the hardcoat films of Examples A1 and A2 comprising a mixture of an ionizing radiation curing resin material having no hydrogen bond and an inorganic filler in a specific ratio had good pencil hardness, degree of curling, and adhesion.

Comparative Example A5

The same material as used in Example A1 was coated onto the same plastic substrate film as used in Example A1. Thereafter, the coating as such was cured, without aging, by electron beam irradiation under conditions of accelerated voltage 175 kV and exposure 10 Mrad to form a hardcoat. Thus, a hardcoat film of Comparative Example A5 was obtained. Although the adhesion of the hardcoat in the hardcoat film was good, slight curling was observed (Δ). Both the hardcoat-forming material per se and the surface of the hardcoat film had a pencil hardness of H.

Example A3

Formation of Antireflection Film

ITO (layer thickness 27 nm), $SiO_2$ (layer thickness 24 nm), ITO (layer thickness 75 nm), and $SiO_2$ (layer thickness 92 nm) were sputtered sequentially onto the hardcoat in the hardcoat film obtained in Example A1 to form an antireflection layer on the hardcoat. Thus, an antireflection film was obtained. The surface of this antireflection film had a pencil hardness of 3H.

Example A4

A 50 μm-thick adhesive polyethylene terephthalate film (manufactured by Toyobo Co., Ltd.) was provided as a transparent plastic substrate film. 0.3% by weight of a photopolymerization initiator [Irgacure 907 (tradename), manufactured by Ciba Specialty Chemicals, K.K.] was added to a 6:4 (weight ratio) mixture of an inorganic filler and an organic component, the organic component being a composition of a 7:3 (weight ratio) mixture of a urethane acrylate oligomer [UV-1700B (tradename), manufactured by Nippon Synthetic Chemical Industry Co., Ltd.] and a polyfunctional acrylate [DPHA (tradename), manufactured by Nippon Kayaku Co., Ltd.], the inorganic filler being colloidal silica [MEK-ST (tradename), manufactured by Nissan Chemical Industries Ltd.]. The mixture was coated onto the substrate film to a thickness of about 3 μm on a dry basis. The coating was dried at 100° C., aged at 100° C. for 30 sec, and then irradiated with ultraviolet light emitted from an ultraviolet irradiation apparatus [H-bulb, manufactured by Fusion Japan K.K.] at 240 mJ/m² to form a hardcoat. Thus, a hardcoat film of Example A4 was obtained.

Comparative Example A6

The procedure of Example A4 was repeated to form a hardcoat on a plastic substrate film, except that the inorganic filler was not added to the ionizing radiation curing resin. Thus, a hardcoat film of Comparative Example A6 was obtained.

Comparative Example A7

The procedure of Example A4 was repeated to form a hardcoat on a plastic substrate film, except that the mixing ratio (weight ratio on a solid basis) of the ionizing radiation curing resin to the colloidal silica was 2:8. Thus, a hardcoat film of Comparative Example A7 was obtained.

Comparative Example A8

The procedure of Example A4 was repeated to form a hardcoat on a plastic substrate film, except that the mixing ratio (weight ratio on a solid basis) of the ionizing radiation curing resin to the colloidal silica was 8:2. Thus, a hardcoat film of Comparative Example A8 was obtained.

Comparative Example A9

The procedure of Example A4 was repeated to form a hardcoat on a plastic substrate film, except that a hydroxyl-containing ionizing radiation curing resin [SR-399 (tradename), manufactured by Nippon Kayaku Co., Ltd.] was used as the ionizing radiation curing resin instead of DPHA of Example A4, and the mixing ratio (weight ratio on a solid basis) of the inorganic filler to the organic component was the same as used in Example A4, that is, 6:4. Thus, a hardcoat film of Comparative Example A9 was obtained.

For the hardcoat films obtained in Examples A4 and Comparative Examples A6 to A9, the pencil hardness of the surface thereof and the pencil hardness of the hardcoat-forming material per se are shown in Table A2. Further, the hardcoat films were evaluated for the degree of curling (the maximum lifting height when a sample having a size of 10×20 cm was taken off). When the warpage at both ends of the specimen was 0 to 5 mm, the hardcoat film was evaluated to the effect that curling was not observed at all (○); when the warpage at both ends of the specimen was not less than 1 cm, the hardcoat film was evaluated to the effect that curling was clearly observed (X); and when the warpage at both ends of the specimen was not less than 5 mm to 1 cm, the hardcoat film was evaluated to the effect that slight curling was observed (Δ). The results are also shown in Table A2. Further, a number of 10 figures (font: MM) was printed on the hardcoat films by means of a dye sublimation transfer type printer (DURA Printer SR, manufactured by Nitto Denko Corp.) to evaluate the suitability for printing (○: No blurring was observed by visual inspection; X: Blurring was observed even in a part of the print). The results are also shown in Table A2.

TABLE A2

|  | Ex. A4 | Comp. Ex. A6 | Comp. Ex. A7 | Comp. Ex. A8 | Comp. Ex. A9 |
|---|---|---|---|---|---|
| Pencil hardness of surface of plastic substrate | B | B | B | B | B |
| Pencil hardness of hardcoat-forming material per se | 3H | H | H | HB | H |

TABLE A2-continued

|  | Ex. A4 | Comp. Ex. A6 | Comp. Ex. A7 | Comp. Ex. A8 | Comp. Ex. A9 |
|---|---|---|---|---|---|
| Pencil hardness of surface of hardcoat film | 2H | HB | HB | HB | H |
| Curling | ○ | X | ○ | X | Δ |
| Suitability for printing | ○ | X | ○ | X | X |

As is apparent from Table A2, the hardcoat film of Examples A4 comprising a mixture of an ionizing radiation curing resin material having no hydrogen bond and an inorganic filler in a specific ratio had good pencil hardness, degree of curling, and suitability for printing.

Example A5

Formation of Hardcoat on Plastic Substrate Film

A 50 µm-thick adhesive polyethylene terephthalate film (manufactured by Toyobo Co., Ltd.) was provided as a transparent plastic substrate film. 0.3% by weight of a photopolymerization initiator [Irgacure 907 (tradename), manufactured by Ciba Specialty Chemicals, K.K.] was added to a 6:4 (weight ratio) mixture of an inorganic filler and an organic component, the organic component being a composition of a 7:3 (weight ratio) mixture of a urethane acrylate oligomer [UV-1700B (tradename), manufactured by Nippon Synthetic Chemical Industry Co., Ltd.] and a polyfunctional acrylate [DPHA (tradename), manufactured by Nippon Kayaku Co., Ltd.], the inorganic filler being colloidal silica [MEK-ST (tradename), manufactured by Nissan Chemical Industries Ltd.]. The mixture was coated onto the substrate film to a thickness of 3 µm on a dry basis. The coating was irradiated with ultraviolet light emitted from an ultraviolet irradiation apparatus (H-bulb, manufactured by Fusion Japan K.K. at 240 mJ/m$^2$ to form a hardcoat. Thus, a hardcoat film of Example A5 was obtained.

Production of Hologram Label

A hologram was duplicated using the following resin solution to form a hologram layer.

| | |
|---|---|
| Silicone: methyl polysiloxanes containing trimethylsiloxysilicic acid [KF-7312 (tradename), manufactured by The Shin-Etsu Chemical Co., Ltd.] | 1 part by weight |
| Polyfunctional monomer [SR-399 (tradename), manufactured by Sartomer] | 20 parts by weight |
| Photoinitiator [Irgacure 907 (tradename), manufactured by Ciba Specialty Chemicals, K.K.] | 5 parts by weight |
| 2-Butanone | 26 parts by weight |

Replication of a hologram was carried out by pressing a substrate film, coated with a curable resin, against an original plate, for holograms, provided on an emboss roller by means of a press roller and guiding the film by means of a guide roller (a continuous duplicator shown in FIG. 1 of Japanese Patent Laid-Open No. 56273/1986).

The resin solution was roll coated at a speed of 20 m/min onto the backside of the polyethylene terephthalate on which the hardcoat had been formed. The coating was dried at 100° C. to vaporize the solvent. Thus, a 2 µm-thick (on a dry basis) photosensitive film for duplication was obtained.

The duplicator had an emboss roller provided with a press stamper prepared continuously from a master hologram prepared using a laser beam. Alternatively, a duplicated hologram may be prepared in a resin plate from a master hologram, and applied onto a cylinder.

The photosensitive films for duplication prepared above were set on the sheet feed side, followed by heat pressing at 150° C. to form fine concave-convex patterns. Subsequently, ultraviolet light was applied from a mercury lamp to perform photo-curing. An aluminum layer was then vapor deposited thereon by vacuum deposition to prepare a reflection type relief hologram.

An adhesive [NISSETSU PE-118+CK101 (tradename), manufactured by Nippon Carbide Industries Co., Ltd.] was roll coated on the surface thereof, and dried at 100° C. to vaporize the solvent. A silicone-treated polyethylene terephthalate film [SP05 (tradename), manufactured by Tokyo Serofan Co., Ltd.] as a release film was then laminated thereon to form a 25 µm-thick (on a dry basis) adhesive layer. Thus, a hologram label of Example A5 was obtained.

Comparative Example A10

The procedure of Example A5 was repeated to form a hardcoat on a plastic substrate film, except that the inorganic filler was not added to the ionizing radiation curing resin. Thus, a hologram label of Comparative Example A10 was obtained.

Comparative Example A11

The procedure of Example A5 was repeated to form a hardcoat on a plastic substrate film, except that the mixing ratio (weight ratio on a solid basis) of the ionizing radiation curing resin to the colloidal silica was 1:9. Thus, a hologram label of Comparative Example A11 was obtained.

Comparative Example A12

The procedure of Example A5 was repeated to form a hardcoat on a plastic substrate film, except that the mixing ratio (weight ratio on a solid basis) of the ionizing radiation curing resin to the colloidal silica was 8:2. Thus, a hologram label of Comparative Example A12 was obtained.

Comparative Example A13

The procedure of Example A5 was repeated to form a hardcoat on a plastic substrate film, except that a hydroxyl-containing ionizing radiation curing resin [tradename: SR-399, manufactured by Nippon Kayaku Co., Ltd.] was used as the ionizing radiation curing resin instead of DPHA of Example A5, and the mixing ratio (weight ratio on a solid basis) of the inorganic filler to the organic component was the same as used in Example A5, that is, 6:4. Thus, a hologram label of Comparative Example A13 was obtained.

For the hologram labels obtained in Example A5 and Comparative Examples A10 to A13, the pencil hardness of the hologram labels in their surface and the pencil hardness of the hardcoat-forming materials are shown in Table A3. Further, the hologram labels were evaluated for the degree of curling and the suitability for printing in the same manner as in Example A4 and Comparative Examples A6 to A9. The results are also shown in Table A3.

TABLE A3

|  | Ex. A5 | Comp. Ex. A10 | Comp. Ex. A11 | Comp. Ex. A12 | Comp. Ex. A13 |
|---|---|---|---|---|---|
| Pencil hardness of surface of plastic substrate | B | B | B | B | B |
| Pencil hardness of hardcoat-forming material per se | 3H | H | H | HB | H |
| Pencil hardness of surface of hologram label | 2H | HB | HB | HB | H |
| Curling | ○ | X | ○ | X | Δ |
| Suitability for printing | ○ | X | ○ | X | X |

As is apparent from Table A3, the hologram label of Example A5 comprising a mixture of an ionizing radiation curing resin material having no hydrogen bond and an inorganic filler in a specific ratio had good pencil hardness, degree of curling, and suitability for printing.

The hardcoat according to the present invention comprises at least one organic component having a polymerizable functional group and an inorganic filler, at least one of the organic components not having a hydrogen bond-forming group. By virtue of this constitution, a structure is created such that, although a network formed by polymerization of the organic component in the hardcoat and a network formed by at least a part of the inorganic filler due to cohesive force between the inorganic filler particles themselves are present independently to some extent, they are partially entangled with each other. Therefore, curling is prevented by virtue of the filling effect exerted by the inorganic filler, and, in addition, both the networks reinforce each other to improve the pencil hardness of the hardcoat per se. According to the hardcoat of the present invention, a structure is spontaneously formed wherein a part of the inorganic filler is present in a larger amount in the outermost surface of the coating than in the interior of the coating. This can provide a hardcoat for plastic substrate films, which also has a surface structure possessing excellent suitability for printing.

According to the hardcoat of the present invention, even though a tacky layer is present on the backside of the plastic substrate film with the hardcoat formed thereon, the transfer of the backside layer onto the hardcoat can be prevented when a plurality of the hardcoat films are put on top of each other or one another, or when the hardcoat film is wound. In particular, high anti-tack properties can be obtained by combined use of two types of inorganic fillers, an inorganic filler having a primary particle diameter of 0.3 to 10 $\mu$m and an inorganic filler having a primary particle diameter of 0.01 to 0.3 $\mu$m, the amount of the inorganic filler having a primary particle diameter of 0.3 to 10 $\mu$m added being not more than 20% by weight of the amount of the inorganic filler having a primary particle diameter of 0.01 to 0.3 $\mu$m added.

Example B1

Introduction of Polymerizable Functional Group into Inorganic Filler 10 ml of 3% by weight of a solution of γ-methacryloxypropyltrimethoxysilane in tetrahydrofuran was added dropwise to 20.2 g of ultrafine particles of silica ["Aerosil 200" (tradename) (average particle diameter of primary particles 12 nm), manufactured by Nippon Aerosil Co., Ltd.] as an inorganic filler with stirring over a period of about 2 min through a glass Pasteur pipette. Thereafter, this solution was stirred with heating for one hr under a nitrogen gas stream to introduce a methacryloyl group into the ultrafine particles of silica on their surface.

After the completion of the reaction, the ultrafine particles of silica were washed several times by centrifugation, and then taken out. The solvent was then removed by vacuum drying, and the dried ultrafine particles of silica were then ground with an agate mortar to obtain ultrafine particles of silica with a methacryloyl group introduced thereinto. The amount of the polymerizable functional group introduced was determined by elementary analysis and found to be 0.13 $\mu$mol per g of silica.

Preparation of Coating Solution for Hardcoat

An ionizing radiation curing resin [DPHA (tradename), manufactured by Nippon Kayaku Co., Ltd.] and the ultrafine particles of silica with a methacryloyl group introduced thereinto obtained by the above method were added in a weight ratio of 1:1 to a polymerization solvent (a 1:1 (weight ratio) mixture of 2-butanone and toluene) so that the total solid content was 10% by weight. Thus, a coating solution was obtained.

Preparation of Hardcoat

A 188 $\mu$m-thick adhesive polyethylene terephthalate film [A4350 (tradename), manufactured by Toyobo Co., Ltd.] was provided as a transparent plastic substrate film. The coating solution prepared just above was bar coated onto the transparent plastic substrate film. The coating was dried to remove the solvent, held at 60° C. for 5 min, and then cured by electron beam irradiation under conditions of accelerated voltage 175 kV and exposure 10 Mrad. The thickness of the coating after final curing was about 6 $\mu$m.

Comparative Example B1

A hardcoat was formed on a plastic substrate film in the same manner as in Example B1, except that a coating having a thickness of 6 $\mu$m after final curing was formed as the hardcoat from a coating solution comprising an ionizing radiation curing resin [DPHA (tradename), manufactured by Nippon Kayaku Co., Ltd.] and ultrafine particles of silica into which the methacryloyl group was not introduced.

Comparative Example B2

Only the same ionizing radiation curing resin as used in Example B1 was coated to a thickness of about 6 $\mu$m on a dry basis onto the same plastic substrate film as used in Example B1, and then cured by electron beam irradiation under conditions of accelerated voltage 175 kV and exposure 10 Mrad.

Comparative Example B3

A 2:8 (weight ratio on a solid basis) mixture of the same ionizing radiation curing resin as used in Example B1 and the same colloidal silica with a methacryloyl group introduced thereinto as used in Example B1 was coated to a thickness of about 6 $\mu$m on a dry basis onto the same plastic substrate film as used in Example B1, and then cured by electron beam irradiation under conditions of accelerated voltage 175 kV and exposure 10 Mrad.

Comparative Example B4

A 1:1 (weight ratio on a solid basis) mixture of the same ionizing radiation curing resin as used in Example B1 and the same colloidal silica with a methacryloyl group introduced thereinto as used in Example B1 was coated to a thickness of about 6 μm on a dry basis onto the same plastic substrate film as used in Example B1. Immediately after drying of the coating to remove the solvent, the coating was cured by electron beam irradiation under conditions of accelerated voltage 175 kV and exposure 10 Mrad.

Comparative Example B5

A 1:1 (weight ratio on a solid basis) mixture of the same colloidal silica with a methacryloyl group introduced thereinto as used in Example B1 and a hydroxyl-containing ionizing radiation curing resin [SR-399 (tradename), manufactured by Nippon Kayaku Co., Ltd.] was coated in the same manner as in Example B1 to a thickness of about 6 μm on a dry basis onto the same plastic substrate film as used in Example B1. The coating was then cured by electron beam irradiation under conditions of accelerated voltage 175 kV and exposure 10 Mrad.

For the hardcoat films obtained in Example B1 and Comparative Examples B1 to B4, the pencil hardness of the surface and the pencil hardness of the hardcoat-forming material per se are summarized in Table B1 below. Further, the hardcoat films were evaluated for the degree of curling. In this evaluation, a film cut into a size of 10 cm×20 cm was horizontally placed on a glass plate, and the maximum height of lifting of the end portion of the film from around the center of the film (reference point) in contact with the glass plate was measured. When the maximum lifting height of the end portion from the reference point was not more than 1 cm, the hardcoat film was evaluated to the effect that curling was not observed at all (◯); when the maximum lifting height of the end portion was not less than 2 cm, the hardcoat film was evaluated to the effect that curling was clearly observed (X); and when the maximum lifting height of the end portion was not less than 1 cm to 2 cm, the hardcoat film was evaluated to the effect that slight curling was observed (Δ). The results are also summarized in Table B1 below. Further, for the hardcoat films, the adhesion was evaluated in terms of the proportion of the number of samples having good adhesion to 100 samples having a size of 1.5 mm square. The results are also shown in Table B1.

Example B2

Formation of Antireflection Film

ITO (layer thickness 27 nm), SiO$_2$ (layer thickness 24 nm), ITO (layer thickness 75 nm), and SiO$_2$ (layer thickness 92 nm) were sputtered sequentially onto the hardcoat in the hardcoat film obtained in Example B1 to form an antireflection layer on the hardcoat. Thus, an antireflection film was obtained. The surface of this antireflection film had a pencil hardness of 3H.

Example B3

Formation of Heat Reflecting Film

ITO was sputtered to a thickness of 500 nm onto the hardcoat in the hardcoat film obtained in Example B1 to form a heat reflecting layer on the hardcoat. Thus, a heat reflecting film was obtained. The surface of this heat reflecting layer had a pencil hardness of 3H.

Example B4

Formation of Ultraviolet Shielding Film

TiO$_2$ was sputtered to a thickness of 100 nm onto the hardcoat in the hardcoat film obtained in Example B1 to form an ultraviolet shielding layer on the hardcoat. Thus, an ultraviolet shielding film was obtained. The surface of this ultraviolet shielding layer had a pencil hardness of 3H.

TABLE B1

|  | Ex. B1 | Comp. Ex. B1 | Comp. Ex. B2 | Comp. Ex. B3 | Comp. Ex. B4 | Comp. Ex. B5 |
|---|---|---|---|---|---|---|
| Pencil hardness of surface of plastic substrate | B | B | B | B | B | B |
| Pencil hardness of hardcoat-forming material per se | 4H | 2H | H | HB | 2H | H |
| Pencil hardness of surface of hardcoat film | 4H | 2H | H | HB | 2B | H |
| Curling | ◯ | ◯ | X | ◯ | ◯ | Δ |
| Adhesion | 100/100 | 100/100 | 100/100 | 50/100 | 100/100 | 75/100 |

As is apparent from Table B1, the hardcoat film of Example B1 comprising a mixture of an ionizing radiation curing resin material not having a hydrogen bond and an inorganic filler in a specified ratio exhibited good results.

Thus, the hardcoat for a plastic substrate film according to the present invention comprises at least one organic component having a polymerizable functional group and an inorganic filler, at least one of the organic components not having a hydrogen bond-forming group, at least a part of the inorganic filler having a polymerizable functional group, wherein, in the film, at least a part of the inorganic filler is reticularly connected and at least a part of the organic component and the inorganic filler forms an independent network while partially forming a covalent bond between these networks. Therefore, curling can be prevented by virtue of the filling effect exerted by the inorganic filler, and, in addition, both the networks reinforce each other to improve the pencil hardness of the hardcoat per se, to prevent cracking and peeling of the hardcoat, and to prevent curling of the hardcoat film per se. Further, the above constitution can provide an antireflection film, a heat reflecting film, and an ultraviolet shielding film to which the hardness properties and the flexibility have been imparted.

What is claimed is:

1. A hardcoat for a plastic substrate for a hologram, comprising a coating composition containing an organic component having a polymerizable functional group and an inorganic filler, said organic component consisting essentially of an ionizing radiation curing resin having no hydrogen bond-forming group, wherein (1) at least a part of the inorganic filler is reticularly connected in the hardcoat, (2) the content of the inorganic filler in the surface of the hardcoat is higher than the content of the inorganic filler in the interior of the hardcoat, and (3) the surface of hardcoat has irregularities.

2. The hardcoat according to claim 1, wherein at least a part of the organic components and the inorganic filler forms an independent network in the hardcoat.

3. The hardcoat according to claim 1, wherein the organic component is an ionizing radiation curing resin material having 4 moles or more, per molecule, of a polymerizable functional group.

4. The hardcoat according to claim 1, wherein the organic component has a number average molecular weight of 1,000 to 30,000.

5. The hardcoat according to claim 1, wherein the inorganic filler comprises ultrafine particles of a metal oxide.

6. The hardcoat according to claim 1, wherein the inorganic filler has a primary particle diameter of 0.01 to 0.3 μm.

7. The hardcoat according to claim 1, wherein the weight ratio of the organic components to the inorganic filler is 2:8 to 7:3.

8. The hardcoat according to claim 6, which further comprises an inorganic filler having a primary particle diameter of 0.3 to 10 μm.

9. The hardcoat according to claim 8, wherein the amount of the inorganic filler having a primary particle diameter of 0.3 to 10 μm added is not more than 20% by weight of the amount of the inorganic filler having a primary particle diameter of 0.01 to 0.3 μm added.

10. A hardcoat film comprising: a plastic substrate film; and the hardcoat according to claim 1 provided on at least one side of the plastic substrate film either directly or through other layer, the plastic substrate film, onto which the hardcoat is applied, and said other layer each having a pencil hardness of 4B to HB, the hardcoat per se having a pencil hardness of H to 5H.

11. An antireflection film comprising: a plastic substrate film; the hardcoat according to claim 1 provided on the plastic substrate either directly or through other layer; and an antireflection layer provided on the hardcoat.

12. A hologram label comprising: a plastic substrate; provided on one side of the plastic substrate film in the following order, a hologram image-forming layer, an aluminum deposit, and a pressure-sensitive adhesive layer; and the hardcoat according to claim 1 provided on the other side of the plastic substrate film.

13. A hardcoat for a plastic substrate for a hologram, comprising a coating composition containing an organic component having a polymerizable functional group and an inorganic filler, said organic component consisting essentially of an ionizing radiation curing resin having no hydrogen bond-forming group, wherein (1) at least a part of the inorganic filler is reticularly connected in the hardcoat and (2) the weight ratio of the organic components to the inorganic filler is 2:8 to 7:3.

* * * * *